United States Patent
Shirota

(10) Patent No.: US 6,939,942 B2
(45) Date of Patent: Sep. 6, 2005

(54) METHOD OF TREATING BY-PRODUCT SALT YIELDED WITH POLYARYLENE SULFIDE

(75) Inventor: Daigo Shirota, Chiba (JP)

(73) Assignees: Petroleum Energy Center, A Jurdical Incorporated Foundation, Tokyo (JP); Idemitsu Kosan Co., Ltd., Tokyo (JP)

(*) Notice: Subject to any disclaimer, the term of this patent is extended or adjusted under 35 U.S.C. 154(b) by 78 days.

(21) Appl. No.: 10/473,450

(22) PCT Filed: Mar. 14, 2002

(86) PCT No.: PCT/JP02/02418
§ 371 (c)(1),
(2), (4) Date: Sep. 30, 2003

(87) PCT Pub. No.: WO02/081549
PCT Pub. Date: Oct. 17, 2002

(65) Prior Publication Data
US 2004/0087758 A1 May 6, 2004

(30) Foreign Application Priority Data
Mar. 30, 2001 (JP) .................................. 2001-098374

(51) Int. Cl.[7] .................................................. C08F 6/00
(52) U.S. Cl. ....................... 528/480; 525/537; 528/388
(58) Field of Search ........................... 525/537; 528/388

(56) References Cited

U.S. PATENT DOCUMENTS

| 3,707,528 A | 12/1972 | Miles |
| 4,274,993 A | 6/1981 | Narisawa et al. |
| 4,639,507 A | 1/1987 | Alewelt et al. |
| 4,820,801 A | 4/1989 | Inoue et al. |
| 4,910,294 A * | 3/1990 | Ogata et al. ................. 528/388 |
| 6,646,105 B2 | 11/2003 | Shirota |
| 2004/0028854 A1 * | 2/2004 | Bosshammer et al. ..... 428/35.7 |

FOREIGN PATENT DOCUMENTS

| EP | 321881 | 6/1989 | |
| JP | 7-207027 | 8/1995 | |
| JP | 10060113 | * 3/1998 | ........... C08G/75/02 |

* cited by examiner

Primary Examiner—Terressa Boykin
(74) Attorney, Agent, or Firm—Oblon, Spivak, McClelland, Maier & Neustadt, P.C.

(57) ABSTRACT

There is disclosed a process for treating a by-product salt of a polyarylene sulfide which comprises subjecting solid matter containing an aprotic organic solvent and the by-product salt that is formed in the case of producing a polyarylene sulfide by polymerization condensation reaction of an alkali metal sulfide and a dihalogenated aromatic compound in the aprotic organic solvent to a drying treatment followed by a firing treatment of the resultant dryingly treated matter at a temperature in the range of 500 to 1000° C. The above process is capable of enhancing the solubility in water, of the by-product salt comprising sodium chloride as the principal component in the production of polyarylene sulfide, and affording waste water which is lowered in SS and COD in the case where the by-product salt is dissolved in water and is discharged as waste water.

10 Claims, No Drawings

METHOD OF TREATING BY-PRODUCT SALT YIELDED WITH POLYARYLENE SULFIDE

TECHNICAL FIELD

The present invention relates to a process for treating a by-product salt that is formed as a by-product in the production of a polyarylene sulfide (hereinafter sometimes referred to as "PAS"). More particularly, it pertains to a process for treating a by-product salt which is capable of enhancing the solubility in water, of the by-product salt that is formed as a by-product in the production of the polyarylene sulfide, and affording waste water which is lowered in SS (suspended solid particles components) and COD (chemical oxygen demand) in the case where the by-product salt is dissolved in water and is discharged as waste water.

BACKGROUND ART

A polyarylene sulfide, especially polyphenylene sulfide is known as an engineering plastic which is excellent in mechanical strength, heat resistance and the like and which has good electrical characteristics and high rigidity. Thus it is widely employed as a variety of materials such as electronic machinery parts and electrical machinery parts.

As a process for producing a polyarylene sulfide, there has heretofore been employed in general, a process in which a dihalogenated aromatic compound such as p-dichlorobenzene and a sodium salt such as sodium sulfide are reacted with each other in the presence of an aprotic organic solvent such as N-methyl-2-pyrrolidone (hereinafter sometimes abbreviated to "NMP") to effect a polymerization condensation reaction.

In the above-mentioned process however, a sodium halogenide as a by-product, which is insoluble in a solvent such as NMP, is incorporated in a resin, whereby the removal of the by-product by cleaning has been far from easy. Moreover, it has been extremely difficult to continuously treat at a high temperature, a polymer and sodium halogenide as a by-product that are formed in the aforesaid process.

Under such circumstances, it has been found that continuous treatment of the polymer at a high temperature is made possible by a method in which the polymerization condensation reaction is conducted by using a lithium salt in place of the sodium salt in the presence of NMP as a solvent to form a lithium halogenide, since the lithium halogenide is soluble in a number of aprotic organic solvents such as NMP as a polymerization solvent, thus enabling it comparatively easy to lower the concentration of lithium in the resin (refer to Japanese Patent Application Laid-Open No. 207027/1995 (Heisei 7).

In the above-mentioned process however, lithium sulfide as a starting raw material for polymerization reaction is obtained, for instance, by reacting lithium chloride with sodium hydroxide to obtain lithium hydroxide, reacting the resultant lithium hydroxide with hydrogen sulfide to obtain lithium hydrosulfide, and subjecting the resultant lithium hydrosulfide to hydrogen sulfide removing reaction. In such reaction system, when lithium chloride is reacted with sodium hydroxide, sodium chloride is formed as a reaction by-product. The resultant sodium chloride, when being subjected to polymerization reaction as such, gives rise to a problem same as the problem arising from the foregoing sodium salt. Accordingly, it is customary that slurry solution containing lithium hydrosulfide thus formed is subjected to solid-liquid separation to separate it into a solvent portion containing lithium hydrosulfide and solid matter containing a by-product salt such as sodium chloride, and the solvent portion is subjected to next lithium sulfide synthesis step, while the by-product salt such as sodium chloride is subjected to drying treatment and is thrown into the discard.

In an ordinary synthesis system, sodium chloride is readily dissolved in water and can be discharged outside the system as waste water. However, in the case of recycling the solvent phase or the like which is obtained by solid-liquid separation of PAS polymerization reaction mixture to use as a starting material, there exists a small amount of an oligomer in the solid mixture. In this case, there is caused a problem in that the by-product salt such as sodium chloride which is formed in the aforesaid reaction and subjected to drying treatment is markedly inferior in solubility in water, thus takes a long time to be dissolved in water and besides, the SS and COD in water after dissolution are made high, thereby inevitably increasing the waste water treatment expense.

It is thought that the surface of sodium chloride particles are covered by the PAS oligomer contained in the starting liquid material owing to the drying treatment, and thus the solubility of such sodium chloride in water is worsened, and that in the case where the dryingly treated matter is dissolved in water to form waste water, the SS and COD are unreasonably increased by the PAS oligomer, residual solvent, etc. in water.

DISCLOSURE OF THE INVENTION

Under such circumstances, it is a general object of the present invention to provide a process for treating a by-product salt of polyarylene sulfide which process is capable of enhancing the solubility in water, of the by-product salt which comprises sodium chloride as a principal component in the production of the polyarylene sulfide, and affording waste water which is lowered in SS and COD in the case where the by-product salt is dissolved in water and discharged outside the system as waste water.

In such circumstances, intensive extensive research and investigation were accumulated by the present inventors in order to achieve the above-mentioned objects. As a result, it has been found that the objects of the present invention can be achieved by dryingly treating a solid mixture containing an aprotic organic solvent and a by-product salt, followed by a firing treatment of the solid mixture, said salt being by-produced in the case of producing a polyarylene sulfide from an alkali metal sulfide and a dihalogenated aromatic compound in the aprotic organic solvent. The present invention has been accomplished on the basis of the foregoing findings and information. Specifically, the present invention provides a process for treating a by-product salt from a polyarylene sulfide which comprises subjecting solid matter containing an aprotic organic solvent and the by-product salt that is formed in the case of producing a polyarylene sulfide by polymerization condensation reaction of an alkali metal sulfide and a dihalogenated aromatic compound in the aprotic organic solvent to drying treatment, followed by a firing treatment of the resultant dryingly treated matter at a temperature in the range of 500 to 1000° C.

THE MOST PREFERRED EMBODIMENTS TO CARRY OUT THE INVENTION

In the following, more detailed description will be given of the present invention.

The polymerization condensation reaction between an alkali metal sulfide and a dihalogenated aromatic compound is put into practice in an aprotic organic solvent.

Examples of the aprotic organic solvent include in general, aprotic organic polar solvents such as amide compounds, lactam compounds, urea compounds, organosulfur compounds and cyclic organophosphorus compounds.

The above-mentioned amide compounds among aprotic organic polar solvents are exemplified by N,N-dimethylformamide; N,N-diethylformamide; N,N-dimethylacetoamide; N,N-diethylacetoamide; N,N-dipropylacetoamide; N,N-dimethylbenzoic acid amide, etc.

The aforesaid lactam compounds are exemplified by N-alkylcaprolactam such as caprolactam; N-methylcaprolactam; N-ethylcaprolactam; N-isopropylcaprolactam; N-isobutylcaprolactam; N-n-propylcaprolactam; N-n-butylcaprolactam; and N-cyclohexylcaprolactam; N-methyl-2-pyrrolidone (NMP); N-ethyl-2-pyrrolidone; N-isopropyl-2-pyrrolidone; N-isobutyl-2-pyrrolidone; N-n-propyl-2-pyrrolidone; N-n-butyl-2-pyrrolidone; N-cyclohexyl-2-pyrrolidone; N-methyl-3-methyl-2-pyrrolidone; N-ethyl-3-methyl-2-pyrrolidone; N-methyl-3,4,5-trimethyl-2-pyrrolidone; N-methyl-2-piperidone; N-ethyl-2-piperidone; N-isopropyl-2-piperidone; N-methyl-6-methyl-2-piperidone; N-methyl-3-ethyl-2-piperidone, etc.

The aforesaid urea compounds are exemplified by tetramethylurea; N,N'-dimethylethyleneurea; N,N'-dimethylpropyleneurea, etc.

The aforesaid organosulfur compounds are exemplified by dimethylsulfoxide; diethylsulfoxide; diphenylsulfone; 1-methyl-1-oxosulfolane; 1-ethyl-1-oxosulfolane; 1-phenyl-1-oxosulfolane etc.

The aforesaid cyclic organophosphorus compounds are exemplified by 1-methyl-1-oxophosfolane; 1-n-propyl-1-oxophosfolane; 1-phenyl-1-oxophosfolane, etc.

Any of the above-exemplified aprotic organic polar solvent can be used alone or by mixing with at least one other or by mixing with a solvent which is not cited above and does not impair the object of the present invention so as to enable the mixture to be used as the foregoing aprotic organic solvent. Of the various aprotic organic solvents as exemplified above are preferable N-alkylcaprolactam and N-alkylpyrrolidone, among which N-methyl-2-pyrrolidone (NMP) is particularly preferable.

The polyarylene sulfide mentioned in the present invention is, for instance, a polymer having at least 70 mol % of the repeating unit represented by —Ar—S— wherein Ar is an arylene group. A typical example includes an polyarylene sulfide having at least 70 mol % of the repeating unit represented by the following general formula (I):

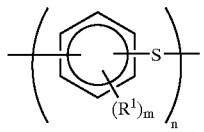

(I)

wherein $R^1$ is a substituent selected from an alkyl group having at most 6 carbon atoms, an alkoxy group, a phenyl group, a metal salt of a carboxylic acid, an amino group, a nitro group and a halogen atom such as a fluorine atom, chlorine atom and bromine atom; m is an integer from 0 to 4; and n denotes average degree of polymerization, and ranges from 10 to 200.

The known polyarylene sulfide is generally classified by its production process into that having a substantially linear molecular structure without a branched or crosslinked structure, and that having a branched or crosslinked structure. In the production process relating to the present invention, any of the polyarylene sulfide is effectively usable.

The polyarylene sulfide is exemplified by a homopolymer or a copolymer each having as the repeating unit, at least 70 mol %, preferably 80 mol % of p-phenylene sulfide. Examples of constituting unit of the copolymer include m-phenylene sulfide unit; o-phenylene sulfide unit; p, p'-diphenyleneketone sulfide unit; p, p'-diphenylenesulfone sulfide unit; p, p'-biphenylene sulfide unit; p, p'-diphenylene ether sulfide unit; p, p'-di-phenylenemethylene sulfide unit; p, p'-diphenylenecumenyl sulfide unit; and naphthylene sulfide unit. Moreover, as a polyarylene sulfide that can be an object relating to the present invention, mention can be made in addition to the foregoing substantially linear polymer, of a branched or crosslinked polyarylene sulfide in which a small amount of monomer having at least three functional groups as a part of monomers is polymerized, and a blended polymer in which the polyarylene sulfide just cited is blended with the foregoing substantially linear polymer.

In the above-mentioned polymerization condensation reaction use is made as starting raw materials, of an alkali metal sulfide and a dihalogenated aromatic compound. Examples of the dihalogenated aromatic compound include dihalogenated benzene such as m-dihalogenated benzene and p-dihalogenated benzene, alkyl-substituted dihalogenated benzene or cycloalkyl-substituted dihalogenated benzene such as 2,3-dihalogenated toluene; 2,5-dihalogenated toluene; 2,6-dihalogenated toluene; 3,4-dihalogenated toluene; 2,5-dihalogenated xylene; 1-ethyl-2,5-dihalogenated benzene; 1,2,4,5-tetramethyl-3,6-dihalogenated benzene; 1-n-hexyl-2,5-dihalogenated benzene; and 1-cyclohexy-2,5-dihalogenated benzene, aryl-substituted dihalogenated benzene such as 1-phenyl-2,5-dihalogenated benzene; 1-benzyl-2,5-dihalogenated benzene; and 1-p-toluyl-2,5-dihalogenated benzene, dihalobiphenyl such as 4,4'-dihalobiphenyl, dihalogenated naphthalene such as 1,4-dihalonaphthalene; 1,6-dihalonaphthalene; and 2,6-dihalonaphthalene, and the like.

On the other hand, examples of the alkali metal sulfide include sodium sulfide, lithium sulfide and potassium sulfide, of which each may be used alone or in combination with at least one other. Further, the alkali metal sulfide may be used in combination with an alkaline earth metal sulfide and/or an other sulfur source. In the process according to the present invention lithium sulfide is preferably used in particular. For instance, lithium sulfide can be produced by reacting lithium hydroxide and hydrogen sulfide in an aprotic organic solvent to form lithium hydrosulfide, and subsequently dehydrogensulfiding the resultant reaction liquid.

That is to say, lithium sulfide is synthesized by the dehydrogensulfiding reaction of lithium hydrosulfide according to the following chemical equation.

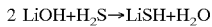

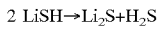

The lithium hydroxide to be used therein is obtained by reacting sodium hydroxide with lithium chloride. The present invention relates to a process for effectively treating a by-product salt such as sodium chloride which is formed in this reaction. The lithium chloride to be used as a starting raw material in the aforesaid reaction may be newly added in whole amount, but it is possible to use lithium chloride contained in a solvent phase which is obtained by solid-liquid separation of PAS polymerization reaction mixture as it is or by properly refining the same.

The hydrogen sulfide is not specifically limited, but there is usable, for instance, hydrogen sulfide in an off gas which is generated from a petroleum refinery.

The molar ratio of hydrogen sulfide to lithium hydroxide that are to be used in the treatment (molar ratio of hydrogen sulfide/lithium hydroxide) is usually at least 1.0 (mol/mol), especially at least 1.05 (mol/mol).

In carrying out the above-mentioned reaction, for instance, a reaction vessel is charged inside with the foregoing aprotic organic solvent and lithium hydroxide, and hydrogen sulfide is blown into the resultant charged liquid to react therewith. In this case, the reaction may be put into practice by blowing hydrogen sulfide in advance into the aprotic organic solvent to dissolve the same, and mixing lithium hydroxide with the solvent thus prepared.

In the present invention, hydrogen sulfide may be blown at atmospheric pressure or under pressure. The blowing time and blowing velocity are not specifically limited. A method for blowing hydrogen sulfide is not specifically limited, but may be for instance, a conventionally used method in which an aprotic organic solvent is incorporated with lithium hydroxide under stirring, and further with gaseous hydrogen sulfide by means of bubbling. This method can be carried out in a continuous system in the absence or presence of water. The reaction temperature is in the range of preferably 80 to 120° C., particularly preferably 90 to 110° C.

By feeding hydrogen sulfide in such a manner, the lithium hydroxide that had been present in solid form in the system is converted into lithium hydrosulfide, which is dissolved in the liquid portion of the system.

In the present invention, after the formation of lithium hydrosulfide, the slurry containing the lithium hydrosulfide and a by-product salt such as sodium chloride is subjected to solid-liquid separation by means of centrifugal separation, whereby the slurry is separated into a solvent phase containing lithium hydrosulfide and a by-product salt such as sodium chloride.

The amounts of the by-product salt such as sodium chloride and the aprotic organic solvent in the solid mixture depend upon a variety of conditions such as the types of the starting raw materials and the solvent, reaction conditions and solid-liquid separation conditions. In general, the contents of sodium chloride and the aprotic organic solvent are 40 to 60% by weight, and 60 to 40% by weight, respectively. The particle diameter of sodium chloride in solid form is approximately 5 to 10 micrometer.

The solvent portion containing lithium hydrosulfide that has been separated by solid-liquid separation is utilized for synthesis reaction in the next step, and the solid mixture is dried to remove and discard the by-product such as solid sodium chloride contained therein. The aprotic organic solvent that has been evaporated and separated through the drying is recovered and reused by being recycled through the synthesis step for lithium hydrosulfide. The drying efficiency can be enhanced by rinsing, prior to the drying, the aprotic organic solvent which contains polymerized by-products such as PAS oligomer stuck to sodium chloride and the like with a refined aprotic organic solvent.

In the present invention, the aforesaid solid matter is at first subjected to a drying treatment in order to recover the organic solvent contained therein. The drying treatment may be any of batchwise system and continuous system by means of atmospheric or vacuum drying. The kind of a dryer is not specifically limited, but there may be used a dryer such as a conventionally used disc dryer, a dryer having a self-cleaning property and the like.

As the conditions in the above-mentioned drying treatment, the temperature of the object to be dried is in the range of 120 to 250° C., preferably 140 to 220° C., and the pressure thereof is atmospheric pressure to 0.001 MPa, preferably atmospheric pressure to 0.01 MPa. The drying treatment time, which depends upon the temperature and pressure of the drying treatment, type of the dryer and the like, can not be unequivocally determined, but one to 10 hours is generally sufficient.

In the present invention, the reaction solvent is recovered by subjecting the solid matter to the drying treatment in such manner, and then the solid matter thus dried is subjected to a firing treatment at a temperature in the range of 500 to 1000° C. By the firing treatment, such organic matter as arylene sulfide oligomer and the solvent are removed, and hence the firingly treated matter is enhanced in solubility in water, and when dissolved in water to form waste water, SS and COD therein are markedly lowered.

As the method for the firing treatment, which may be any of batchwise and continuous systems, a solid firing method or melting method is preferably adoptable. In the case where the solid firing method is adopted, the firing treatment is carried out usually by using a kiln at a temperature preferably in the range of 500 to 800° C. for about 0.5 to 5 hours. On the other hand, in the case where the melting method is adopted, the firing treatment is carried out usually by using a melting furnace at a temperature preferably in the range of 800 to 1000° C. for about 0.1 to 2 hours.

In the present invention, a comonomer, a branching agent, an end terminator and the like may be combinedly used with the above-mentioned dihalogenated aromatic compound to the extent that the effect thereof is not impaired thereby. Examples of the comonomer include 2,3-dichlorophenol; 2,3-dibromophenol; 2,4-dichlorophenol; 2,4-dibromophenol; 2,5-dichlorophenol; 2,5-dibromophenol; 2,4-dichloroaniline; 2,4-dibromoaniline; 2,5-dichloroaniline; 2,5-dibromoaniline; 3,3'-dichloro-4,4'-diaminobiphenyl; 3,3'-dibromo-4,4'-diaminobiphenyl; 3,3'-dichloro-4,4'-dihydoxybiphenyl; 3,3'-dibromo-4,4'-dihydoxybiphenyl; di(3-chloro-4-amino)phenylmethane; m-dichlorobenzene; m-dibromobenzene; o-dichlorobenzene; o-dibromobenzene; 4,4'-dichlorodiphenyl ether; and 4,4'-dichlorodiphenylsulfone. Examples of the branching agent include 1,2,4-trichlorobenzene; 1,3,5-trichlorobenzene; and 1,2,3-trichlorobenzene.

Examples of the end terminator include a halogenated phenol such as p-bromophenol; m-bromophenol; o-bromophenol; p-chlorophenol; m-chlorophenol; o-chlorophenol; p-fluorophenol; m-fluorophenol; o-fluorophenol; p-iodophenol; m-iodophenol; o-iodophenol. Of these, p-bromophenol and p-chlorophenol are preferable.

With regard to the proportion of the starting raw materials to be used in the process according to the present invention, the molar ratio of the dihalogenated aromatic compound to the alkali metal sulfide is preferably 0.8 to 1.2, more preferably 0.9 to 1.1, particularly preferably 0.95 to 1.05. When the molar ratio is outside the range of 0.8 to 1.2, there exists a fear of failure to obtain a polyarylene sulfide having a high molecular weight.

The polymerization condensation reaction of PAS may be put into practice by one stage reaction at a temperature in the range of 230 to 290° C., approximately, preferably 240 to 280° C., more preferably 250 to 270° C., or by the combination of the above-mentioned polymerization condensation and a preliminary polymerization prior thereto at a temperature in the range of 180 to 230° C., preferably 190 to 220°

C., more preferably 195 to 215° C. The polymerization condensation reaction time is usually 0.5 to 10 hours, preferably 1.0 to 10 hours, more preferably 1.5 to 10 hours. The polymerization condensation reaction time, when being less than 0.5 hour, causes a fear of insufficient reaction resulting in failure to assure a sufficiently high molecular weight, whereas the reaction time, when being more than 10 hour, does not exert the working effect in proportion to the reaction time. The polymerization condensation vessel may be either a batchwise system or a continuous system, but the latter is preferable in the present invention.

The present invention is particularly useful in the case of recyclingly using as a starting liquid material, the solvent phase which is obtained by the solid-liquid separation for the polymerization reaction mixture of PAS, that is, in the case where a small amount of oligomer is present in the solid-state mixture.

In summarizing the working effects of the present invention, it is enabled by the process according to the present invention to remarkably enhance the solubility in water, of the by-product salt comprising sodium chloride as a principal component, and when being dissolved in water to form waste water, to provide a method for treating the by-product salt of polyarylene sulfide which method affords waste water lowered in SS and COD in the case of producing a polyarylene sulfide.

In what follows, the present invention will be described in more detail with reference to working examples, which however shall never limit the present invention thereto.

EXAMPLE 1

An aqueous solution of sodium hydroxide having a concentration of 48% by weight in an amount of 118 kg was added to 545 kg of a starting raw material in liquid form which had been generated from a PAS production pilot plant as polymer cleaning solution (chemical composition: 11% by weight of LiCl, 0.6% by weight of PAS oligomer and the balance being NMP). The slurry thus obtained was centrifuged to separate into solid and liquid. As a result, there was obtained 233 kg of solid cake containing 14% by weight of LiOH and 35% by weight of NaCl. The cake was added to 500 kg of NMP to be again slurried. In order to convert the LiOH to LiSH, a sufficient amount of $H_2S$ being 35 n-m$^3$ in total was blown into the resultant slurry, while stirring the same. The resultant slurry containing LiSH was centrifuged. As a result, there was obtained 158 kg of solid cake containing 51% by weight of NaCl. The cake was added to 500 kg of NMP to be again slurried. The resultant slurry was centrifuged with a result that 154 kg of solid cake containing 52% by weight of NaCl was obtained. Subsequently, the solid cake was continuously dried by using a self-cleaning type dryer manufactured by Kurimoto Ltd. under the trade name "SC processor SCP series 100" in the conditions including a temperature of the object to be dried being 150° C., a heating medium temperature of 190° C., pressure of 14 kPa-abs and a starting material feed rate of 38 kg/hour. The dried matter was further subjected to final batchwise drying at a temperature of the object to be dried being 200° C., a heating medium temperature of 240° C. under atmospheric pressure. The finally dried matter had a chemical composition consisting of 2.0% by weight of PAS oligomer, 710 ppm of NMP and the balance of NaCl.

The finally dried matter was fed in a continuous outside heating type kiln having an inside diameter of 150 mm and a length of 720 mm (an effective volume of 12 liter) at a feed rate of 1.2 kg/hour, and subsequently was subjected to a continuous firing treatment at 600° C. for 70 minutes as the retention time. The resultant firingly treated matter in an amount of 30 g was fed in 500 milliliter (mL) of water, and a measurement was made of the dissolving rate etc. thereof through the following procedure. As a result, the treated matter indicated a dissolving rate of at most 5 minutes, SS of 10 ppm and COD of 20 ppm.

{Measuring Method for Dissolving Rate}

By using an ion electrode meter which has already been immersed in water, the lapse of time from feeding the firingly treated matter in the water under stirring with a stirrer until the ion potential thereof no longer rises is regarded as the dissolving rate (minutes) of the product.

EXAMPLE 2

The procedure in Example 1 was repeated to carry out the firing treatment and evaluate the firingly treated matter except that the firing temperature was set on 700° C. As a result, the treated matter indicated a dissolving rate of at most one minute, SS of 3 ppm and COD of 7 ppm.

EXAMPLE 3

The dried matter same as that in Example 1 was continuously fed in a swirling type melting furnace having an inside diameter of 300 mm and a length of 1500 mm (an effective volume of 90 liter) at a feed rate of 5.0 kg/hour, and subsequently was subjected to a continuous firing treatment at 905° C. for 30 minutes as the retention time. The resultant firingly treated matter was allowed to cool and evaluated in the same manner as in Example 1. As a result, the treated matter indicated a dissolving rate of at most one minute, while SS and COD were not detected.

COMPARATIVE EXAMPLE 1

The dried matter same as that in Example 1 was evaluated in the same manner as in Example 1 without firing treatment. As a result the dried matter indicated a dissolving rate of 30 minute, SS of 1200 ppm and COD of 212 ppm.

INDUSTRIAL APPLICABILITY

The present invention relates to a process for treating a by-product salt of polyarylene sulfide which process is capable of enhancing the solubility in water, of the by-product salt that is formed as a by-product in producing polyarylene sulfide, and affording waste water which is lowered in SS (suspended solid particles components) and COD (chemical oxygen demand) in the case where the by-product salt is dissolved in water and is discharged as waste water. A polyarylene sulfide, especially polyphenylene sulfide is employed as an engineering plastic which is excellent in mechanical strength, heat resistance and the like and which has favorable electrical characteristics and high rigidity, and is useful as a variety of materials such as electronic machinery parts and electrical machinery parts.

What is claimed is:

1. A process for treating a by-product salt of a polyarylene sulfide which comprises subjecting solid matter containing an aprotic organic solvent and the by-product salt that is formed in the case of producing a polyarylene sulfide by polymerization condensation reaction of an alkali metal sulfide and a dihalogenated aromatic compound in the aprotic organic solvent to a drying treatment, followed by a firing treatment of the resultant dryingly treated matter at a temperature in the range of 500 to 1000° C.

2. The process according to claim 1, wherein the dryingly treated matter is subjected to the firing treatment by means of solid firing method or melting method.

3. The process according to claim 2, wherein the dryingly treated matter is subjected to the firing treatment by means of solid firing method at a temperature in the range of 500 to 800° C.

4. The process according to claim 2, wherein the dryingly treated matter is subjected to the firing treatment by means of melting method at a temperature in the range of 800 to 1000° C.

5. The process according to claim 1, wherein the by-product salt is sodium chloride.

6. The process according to claim 1, wherein the alkali metal sulfide is lithium sulfide.

7. The process according to claim 6, wherein the lithium sulfide is produced by removing hydrogen sulfide from lithium hydrosulfide which is produced by reacting lithium hydroxide with hydrogen sulfide in an aprotic organic solvent.

8. The process according to claim 7, wherein the lithium hydroxide is produced by reacting sodium hydroxide with lithium chloride.

9. The process according to claim 1, wherein the polyarylene sulfide has at least 70 mol % of the repeating unit represented by the following general formula (I):

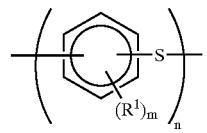

(I)

wherein $R^1$ is a substituent selected from an alkyl group having at most 6 carbon atoms, an alkoxy group, a phenyl group, a metal salt of a carboxylic acid, an amino group, a nitro group and a halogen atom; m is an integer from 0 to 4; and n denotes average degree of polymerization and ranges from 10 to 200.

10. The process according to claim 1, wherein the aprotic organic solvent is N-methyl-2-pyrrolidone.

* * * * *